W. CROOK.
Harvester Rake.

No. 19,913.

Patented April 13, 1858.

UNITED STATES PATENT OFFICE.

WM. CROOK, OF NEW HOPE, PENNSYLVANIA.

IMPROVEMENT IN MOWING-MACHINES.

Specification forming part of Letters Patent No. 19,913, dated April 13, 1858.

*To all whom it may concern:*

Be it known that I, WILLIAM CROOK, of New Hope, Buck's county, State of Pennsylvania, have invented a new and useful Improvement in Mowing-Machines; and I do hereby declare the following to be a full, clear, and exact description of the same, reference being had to the accompanying drawings, and to the letters of reference marked thereon.

My invention relates to an improvement in that class of mowing-machines in which the cutter-frame is hinged to the main frame; and my improvement consists in securing the driver's seat to the cutter-frame, and so far behind the center of vibration of the latter that the weight of the driver may act as a counter-balance, or nearly so, to the cutting apparatus, and thus lessen its friction on the ground, that the driver may by simply changing the center of gravity of his body raise the cutting apparatus from the ground and allow it to fall again, and that the driver's hands may be at liberty for the proper management of the horses during the operation of the machine.

In order to enable others skilled in the art to make and use my invention, I will now proceed to describe its construction and operation.

Figure 1:
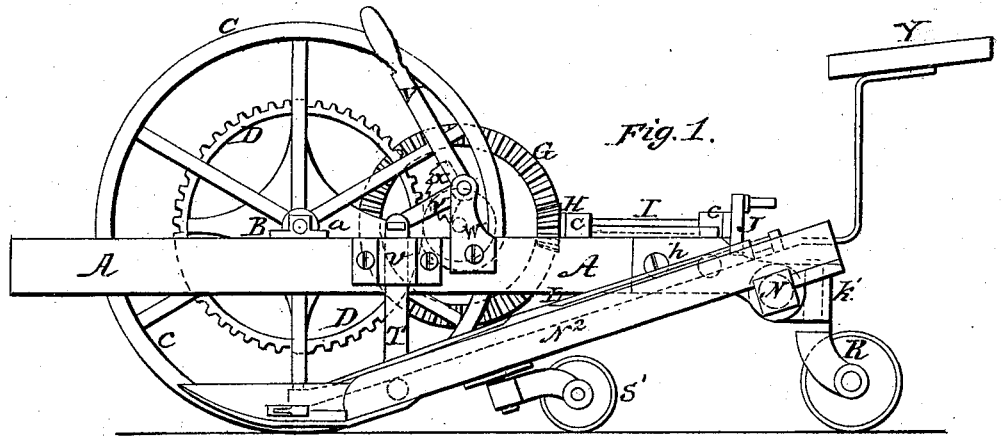
Figure 2:
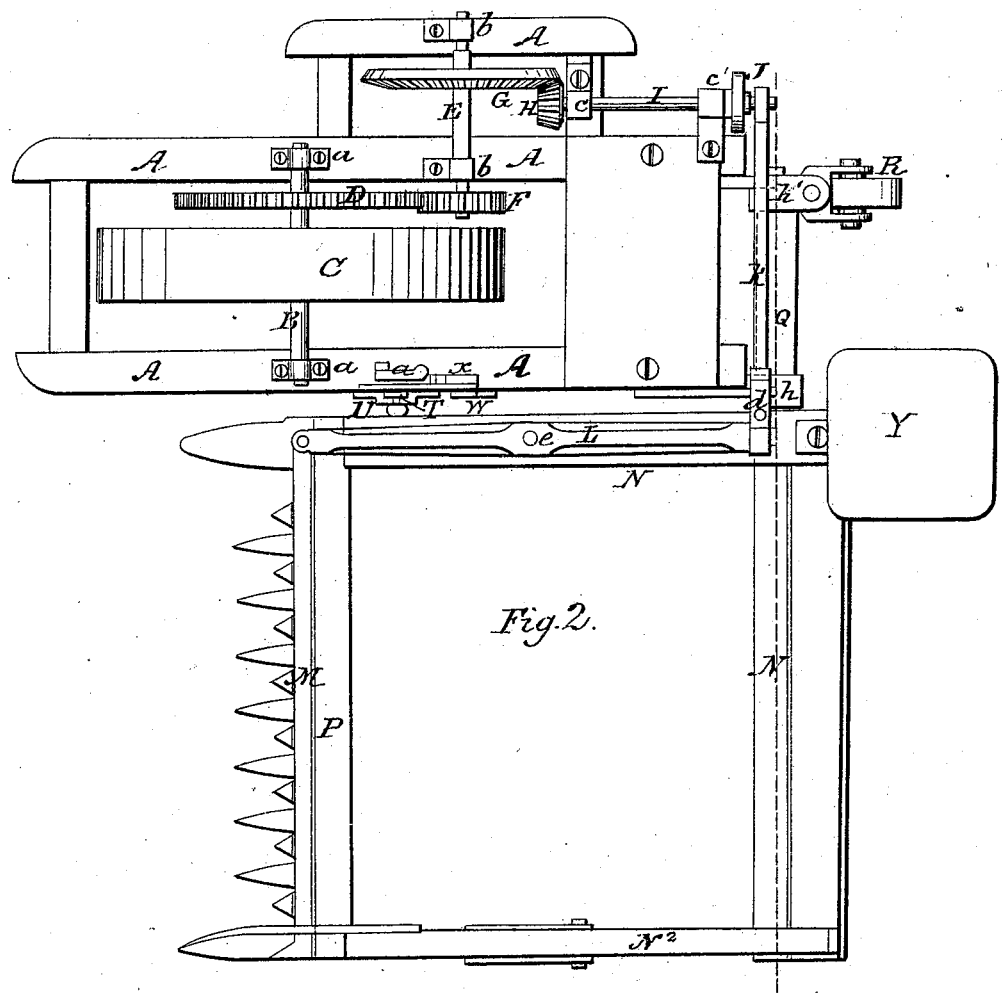

On reference to the accompanying drawings, which form a part of this specification, Figure 1 is an end view of a mowing-machine, looking in the direction of the arrow, Fig. 2, and showing my improvement; Fig. 2, a ground plan.

A is the main frame of the harvester, to which are secured the boxes $a\ a$, $b\ b$, and $c\ c$. The shaft B, with its driving-wheel C and cog-wheel D, turns in the boxes $a\ a$. The shaft E, with its pinion F, which gears into the wheel D and the bevel-wheel G, turns in the boxes $b\ b$. The shaft I, with its pinion H, which gears into the bevel-wheel G, turns in the boxes $c\ c$.

A rod, K, is connected at one end to the pin of the crank-wheel J, and at the opposite end (by means of the swivel-joint $d$) to the end of one arm of the lever L, which has its fulcrum on a pin, $e$, attached to the inside bar, N, of the cutter-frame. The latter is composed of the last-named bar N, the back bar, N′, the off bar N², and the cutter-bar P. The end of the other arm of the lever L is jointed to the end rod, M, to which the cutters are attached.

A continuation, Q, of the back bar, N′, and with it the whole of the cutter-frame, turns in the brackets $h$ and $h'$ on the main frame. The caster R for supporting the end of the main frame is hung to the bracket $h'$, the caster S serving to support the end of the cutter-frame. A bar, T, is jointed to the inside bar, N, of the cutter-frame, passing through and being guided by a staple, U, on the main frame, the top of the bar being jointed to the end of the short arm of the bell-crank lever V, which has its fulcrum on a bracket, W, secured to the main frame of the machine, a segment, X, of a ratchet-wheel being secured to the lever and adapted to receive the end of the pawl $w$, which retains the lever and the entire frame in the position to which it may be raised.

As the above-described parts form no part of my present invention, they being introduced as a means only of illustrating my improvement, and as their mode of operation will be readily understood, a more detailed description will be unnecessary.

To the back of the cutter-frame I secure the driver's seat Y so far behind the center of vibration of the cutter-frame that a man of ordinary weight when sitting on it will act as a counter-balance, or nearly so, to the cutting apparatus. This location and arrangement of the driver's seat has a threefold object:

First. The main cause of the heavy and laborious draft of mowing-machines is the friction of the heavy cutting apparatus on the ground. It will be needless to remark that the machine is partially, at least, relieved from this friction by the peculiar situation of the driver's seat.

Second. The driver can by simply leaning backward or forward, or otherwise changing the center of gravity of his body on the seat, readily raise the cutter-frame, so as to be free from any obstructions which may present themselves, and as readily allow it to fall by its own weight, and without the aid of the usual mechanical appliances for effecting the same purpose.

Third. The driver has the free use of his hands for the management of his horses during the operation of the machine.

The elevating apparatus consisting of the bar T, bell-crank lever V, and ratchet-segment and pawl is brought into requisition when the machine has to be removed from place to place without operating or when being taken from the field.

I claim and desire to secure by Letters Patent—

Securing the driver's seat to the hinged cutter-frame of a mowing-machine in such a position as regards the center of vibration of said frame that the weight of the driver may act as a counter-balance, or nearly so, to the cutting apparatus, for the purpose specified.

In testimony whereof I have signed my name to this specification before two subscribing witnesses.

WILLIAM CROOK.

Witnesses:
 HENRY HOWSON,
 HENRY ODIORNE.